United States Patent
Keiser et al.

(10) Patent No.: US 6,486,216 B1
(45) Date of Patent: Nov. 26, 2002

(54) STABLE COLLOIDAL SILICA AQUASOLS

(75) Inventors: Bruce A. Keiser, Naperville, IL (US); Maureen B. Nunn, Naperville, IL (US); Cheng-Sung Huang, Naperville, IL (US); Dennis L. MacDonald, Wheaton, IL (US)

(73) Assignee: Ondeo Nalco Company, Naperville, IL (US)

( * ) Notice: Subject to any disclaimer, the term of this patent is extended or adjusted under 35 U.S.C. 154(b) by 34 days.

(21) Appl. No.: 09/604,335

(22) Filed: Jun. 27, 2000

Related U.S. Application Data

(63) Continuation-in-part of application No. 09/036,104, filed on Mar. 6, 1998, now abandoned.

(51) Int. Cl.⁷ ............... C01B 33/141; C01B 33/12; B01F 3/12
(52) U.S. Cl. .............. 516/82; 423/338; 106/482; 162/181.6
(58) Field of Search ................ 516/82; 423/338; 106/482; 162/181.6

(56) References Cited

U.S. PATENT DOCUMENTS

| | | | |
|---|---|---|---|
| 2,244,325 A | 6/1941 | Bird | 516/83 |
| 2,801,938 A * | 8/1957 | Iler | 516/82 |
| 3,582,502 A | 6/1971 | Farrow et al. | 521/55 |
| 3,714,064 A * | 1/1973 | Vossos | 516/82 |
| 4,385,961 A | 5/1983 | Svending et al. | 162/181.6 |
| 4,753,710 A | 6/1988 | Langley et al. | 162/164.3 |
| 4,795,531 A | 1/1989 | Sofia et al. | 162/181.6 |
| 4,954,220 A | 9/1990 | Rushmere | 162/181.6 |
| 5,277,764 A | 1/1994 | Johansson et al. | 162/181.6 |
| 5,279,807 A | 1/1994 | Moffett et al. | 516/82 |
| 5,368,833 A | 11/1994 | Johansson et al. | 516/82 |
| 5,447,604 A | 9/1995 | Johansson et al. | 106/482 |
| 5,571,494 A | 11/1996 | Saastamoinen | 516/82 |
| 5,584,966 A | 12/1996 | Moffett | 162/168.1 |
| 5,603,805 A | 2/1997 | Andersson et al. | 162/181.6 |
| 5,607,552 A * | 3/1997 | Andersson et al. | 162/181.6 |
| 5,643,414 A | 7/1997 | Johansson et al. | 162/181.6 |
| 5,964,693 A | 10/1999 | Brekau et al. | 516/82 |
| 6,372,089 B1 * | 4/2002 | Keiser et al. | 162/168.3 |
| 6,372,806 B1 * | 4/2002 | Keiser et al. | 516/82 |
| 6,379,500 B2 * | 4/2002 | Greenwood et al. | 516/81 |
| 2001/0004927 A1 * | 6/2001 | Greenwood et al. | 162/168.3 |

FOREIGN PATENT DOCUMENTS

| | | |
|---|---|---|
| WO | WO 96/30591 | 10/1996 |
| WO | WO 97/16598 | 5/1997 |

OTHER PUBLICATIONS

The Chemistry of Silica, by Ralph K. Iler, ©1979 month unknown, by Ralph Wiley & Sons, pp. 3–12.

Iler and Dalton. J. Phys. Chem. 60. pp. 955–957 (Jul. 1956), Degree of Hydration of Particles of Colloidal Silica in Aqueous Solution.

Analytical Chemistry, vol. 28, p. 1981 (1956), month unknown, Determination of Specific Surface Area of Colloidal Silica by Titration with Sodium Hydroxide, by George W. Sears, Jr.

1998–2000, month unknown, Sales Records For Nalco© 8691, Nalco Chemical Co., Naperville, Il., pp. 1–11.

* cited by examiner

Primary Examiner—Daniel S. Metzmaier
(74) Attorney, Agent, or Firm—Margaret M. Brumm; Thomas M. Breininger

(57) ABSTRACT

A stable aquasol containing colloidal silica having a surface area of from about 700 $m^2/g$ to about 1100 $m^2/g$, and an S-value of from about 20 to about 50; wherein the colloidal silica is not surface treated; wherein the molar ratio of $SiO_2/Na_2O$ in the colloidal silica is greater than about 13.0:1 and is less than about 17.0:1; and wherein the aquasols have a percent by weight $SiO_2$ solids level of from about 7.00 percent to about 16.80 percent is described and claimed.

3 Claims, No Drawings

STABLE COLLOIDAL SILICA AQUASOLS

RELATED PATENT APPLICATIONS

This patent application is a continuation-in-part patent application of U.S. patent application Ser. No. 09/036,104, filed Mar. 6, 1998, now abandoned

BACKGROUND OF THE INVENTION

Colloidal silicas are known materials that are known to be useful in papermaking to enhance the retention and drainage of pulps used to make paper.

U.S. Pat. Nos. 5,643,414 and 5,368,833 describe a colloidal silica microparticle consisting of high surface area, i.e., greater than 700 m$^2$/g and an S-value between 20 and 40 which is useful in papermaking. These patents teach the need for surface treatment of the colloidal silica particle with aluminum in order to stabilize the surface area and thereby the product. U.S. Pat. No. 5,603,805 also describes a colloidal silica having a surface area less than 700 m$^2$/g and with an S-value of 20 to 40 which can be used in the making of paper. This patent clearly teaches that surface areas of less than 700 m$^2$/g are needed in order to obtain a stable colloidal silica product without aluminum surface treatment that is useful in the paper making application.

It would be highly useful to have additional colloidal silica aquasols available for use in various applications, including papermaking applications.

SUMMARY OF THE INVENTION

The instant claimed invention is a stable aquasol comprising colloidal silica having a surface area of from about 700 m$^2$/g to about 1100 m$^2$/g, and an S-value of from about 20 to about 50; wherein said colloidal silica is not surface treated; wherein the molar ratio of SiO$_2$/Na$_2$O in said colloidal silica is greater than about 13.0:1 and is less than about 17.0:1; and wherein said aquasols have a percent by weight SiO$_2$ solids level of from about 7.00 percent to about 16.80 percent.

DETAILED DESCRIPTION OF THE INVENTION

The instant claimed invention is a stable aquasol comprising colloidal silica having a surface area of from about 700 m$^2$/g to about 1100 m$^2$/g, and an S-value of from about 20 to about 50; wherein said colloidal silica is not surface treated; wherein the molar ratio of SiO$_2$/Na$_2$O in said colloidal silica is greater than about 13.0:1 and is less than about 17.0:1; and wherein said aquasols have a percent by weight SiO$_2$ solids level of from about 7.00 percent to about 16.80 percent.

These stable aquasols are useful in the application of making paper.

Contrary to the teachings of the known art, the aquasols of the present invention advantageously provide a colloidal silica that remains stable without the addition of an aluminum surface treatment. Furthermore, the colloidal silica aquasols of the present invention advantageously exhibit excellent activity not only in alkaline furnishes but also in acid furnishes in papermaking. The colloidal silica aquasols of the present invention are useful, among other areas, in the papermaking industry, for example, as retention and dewatering aids.

The aquasols of the present invention comprise colloidal silica having a surface area of from about 700 m$^2$/g to about 1100 m$^2$/g. The surface area is determined using the Sears Method, as described in *Anal. Chem.*, 28, 1981(1956). Preferably the colloidal silica has a surface area greater than about 700 m$^2$/g, more preferably greater than about 790 m$^2$/g, and most preferably greater than about 857 m$^2$/g. Preferably, the colloidal silica has a surface area less than about 1100 m$^2$/g, more preferably, less than about 970 m$^2$/g.

The colloidal silica in the aquasols has an S-value, of from about 20 to about 50, preferably from about 22.5 to about 50. The S-value is determined using the procedure described in *J. Phys. Chem.*, Iler and Dalton, 60, 955(1956).

As used herein, a "stable aquasol" is defined as one comprising colloidal silica with a surface area above 700 m$^2$/g and whose S-value remains in the range of from about 20 to about 50 as the aquasol is aged at room temperature for a period of at least 30 days. Aquasols of the present invention can be produced and stored and remain stable at room temperature for at least 30 days.

Aquasols of the present invention can be produced and stored at concentrations of from about 7.00 percent by weight SiO$_2$ solids to about 16.80 percent by weight SiO$_2$ solids. More preferably the percent by weight SiO$_2$ solids is from about 7.00 percent to about 14.00 percent. Most preferably, the percent by weight SiO$_2$ solids is from about 11.50 percent to about 13.70 percent.

Aquasols of the present invention can be made by following this process. A process for making a stable colloidal silica aquasol comprising:

(a) forming a heel, with said heel containing water, an alkali metal silicate wherein the molar ratio of SiO$_2$ to Na$_2$O or K$_2$O is greater than about 1:1 and is less than about 15:1; an acid (and/or a corresponding salt thereof), wherein said heel has a pH of at least 10, wherein the alkali metal silicate and acid are initially present in a ratio by weight of at least 63:1, wherein the temperature of the heel is below 100 degrees F.;

(b) adding to the initial composition an aqueous silicic acid composition typically having a SiO$_2$ content in the range of from about 5.0 to about 7.2 percent by weight, while maintaining the temperature of the composition below 100 degrees F., wherein the aqueous silicic acid composition is added slowly and continuously until from about one-half to about three-quarters of the silicic acid composition has been added to the initial composition;

(c) increasing the temperature of the composition from below 100 degrees F. to between about 115 degrees F. and about 125 degrees F. in a time period of from about 10 to about 35 minutes, and maintaining the temperature until the addition of all the silicic acid composition is complete;

(d) optionally, maintaining the temperature of the composition below 125 degrees F for about an hour; and (e) discontinuing the heating and (f) optionally removing water from the resulting composition until the solids content based on SiO$_2$ of the resulting aquasol is at least about 7.00 percent by weight.

The process begins with the preparation of an initial composition, known as a "heel", followed by addition of a source of active silica, usually in the form of silicic acid or polysilicic acid, over a specified time. In the above process, the initial heel is composed of water, any of a number of commercially available silicates or alkali water glasses, and an acid and/or a corresponding salt thereof in a prescribed ratio. While the order of addition is not important, for purposes of ease of manufacture, it has been discovered that the acid preferably should be added to the dilution water, prior to the addition of the silicate.

During the addition of the active silica, the reaction temperature is controlled within a specified reaction temperature profile. The alkali water glasses or silicates can be any number of conventional materials. These are normally potassium or sodium salts. The mole ratio of $SiO_2$ to $Na_2O$ or $K_2O$, is from about 1:1 to about 15:1 and is preferably within the range of from about 2.5:1 to 3.9:1. Such water glass solutions typically will have a pH in excess of 10, typically around 11.

The acid used in the above process can be any number of organic or mineral acids. Examples of such acids include, but are not limited to: mineral acids such as hydrochloric, phosphoric or sulfuric or such materials as carbon dioxide. Organic acids include but are not limited to: acetic acid, formic acid and propionic acid. Examples of suitable salts include: sodium sulfate, sodium acetate, potassium sulfate, potassium acetate, trisodium phosphate and sodium monohydrogen phosphate.

Once the heel is prepared in the above process, the temperature of the composition is reduced to 85 degrees F. or lower, typically to 80 degrees F. or lower, and usually in a range of from 60 to 85 degrees F. At this point, silicic acid or poly silicic acid is slowly added to the composition, for example over a total period of about 4 hours. Silicic acid suitable for the present invention can be prepared via known methods in the art, such as the cation exchange of dilute solutions of alkali water glasses as described above. Typically, the dilute solutions contain from 3.0 to 9.0 percent by weight solids based on $SiO_2$, typically from 5.0 to 7.2 percent by weight, and preferably from 6.0 to 6.8 percent by weight. Typical commercial preparations are outlined in U.S. Pat. Nos. 3,582,502 and 2,244,335, the disclosures of which are hereby incorporated by reference. While the ratio by weight of the alkali metal silicate to acid can vary, typically the ratio is at least 63:1. The silicic acid or poly silicic acid is slowly and continuously added to the composition with stirring, until from about one-half to about three-quarters of the silicic acid or poly silicic acid has been added to the composition while maintaining the temperature of the composition below 85 degrees F., typically from about 60–85 degrees F. Thereafter, the temperature of the composition is slowly raised, for example over a period of from 10 to 35 minutes, to from 115–125 degrees F. and held in this temperature range until the addition of the remainder of the silicic acid or poly silicic acid to the composition is complete.

Once the prescribed amount of active silica is added, the mixture can be concentrated. The concentration process can be carried out using a variety of methods. Such methods may include, but are not limited to, evaporation and/or membrane separation techniques such as ultrafiltration or microfiltration. During the concentration process, the temperature of the composition can be maintained at below 125 degrees F., typically from 115 to 125 degrees F. for about an hour. The water is removed until the final aquasol product contains from about 7.00 percent to about 16.8 percent by weight $SiO_2$.

An alternative process suitable for preparing a stable colloidal silica sol of the invention comprises:

(a) charging a reaction vessel with a cationic ion exchange resin having at least 40 percent of its ion exchange capacity in the hydrogen form wherein the reaction vessel has means for separating the colloidal silica formed during the process from the ion exchange resin;

(b) charging the reaction vessel with an aqueous alkali metal silicate having a mole ratio of $SiO_2$ to alkali metal oxide in the range of from about 1:1 to about 15:1 and a pH of at least 10.0, (c) stirring the contents of the reaction vessel until the pH of the contents of the vessel is in the range of from about 8.5 to about 11.0;

(d) adjusting the pH of the contents of the reaction vessel to above about 10.0, using an additional amount of the alkali metal silicate; and (e) separating the resulting colloidal silica of the invention from the ion exchange resin while removing the colloidal silica from the reaction vessel.

This alternative process involves the use of a cationic ion exchange resin, preferably a weak acid cationic ion exchange resin, to initiate the reaction of the alkali metal silicate (see Example 3 below) to produce the colloidal silica. The reaction is controlled by the rate of addition and the ratio of alkali metal silicate to ion exchange resin during the polymerization to produce the colloidal silica. Heat treatment of the colloidal silica product is optional in this embodiment of the process of the invention.

The reaction is controlled by the rate of addition (for example, from 0 to 30 minutes, typically less than 15 minutes) and the ratio of alkali metal silicate to ion exchange resin during the polymerization to produce the colloidal silica. The molar ratio of hydrogen ion in the cationic ion exchange resin to alkali metal ion in the alkali metal silicate ranges from 40 to 100 percent, preferably from 50 to 100 percent. The temperature during colloidal silica formation in this alternative embodiment of the invention generally ranges from 50 degrees F. to 100 degrees F., preferably from 70 degrees F. to 90 degrees F. Heat treatment of the colloidal silica product (i.e., post treatment) is optional in this embodiment of the process of the invention.

The adjustment of pH in step (d) can be carried out either in the reaction vessel or after the resulting colloidal silica has been removed from the reaction vessel. This adjustment of pH typically is carried out within 10 minutes to 3 hours from when step (e) has been completed.

Colloidal silica aquasol compositions of the invention have been shown to be from 20 to 40 percent more effective as a drainage and retention aid in the papermaking process compared to prior art known compositions. Moreover, the compositions of the present invention have been shown to unexpectedly exhibit activity in areas where art known compositions have not been active, primarily in acid furnishes for the papermaking process. While the preferred utility for colloidal silica aquasol compositions of the invention is as a drainage and retention aid in the manufacture of paper, compositions of the invention may be used for other purposes, for example, for beer, wine, juice, and sugar clarification; water clarification including raw and waste water clarification; as catalyst supports; as a component of coating compositions; as a coating component for plastics; as an abrasion resistant coating component; for investment casting; as a component of ceramic fireplace logs; and in refractory materials.

Accordingly, the invention further comprises a method of improving the production of paper which comprises the step of adding to a paper mill furnish from about 0.00005 to about 1.25 percent by weight based on the dry weight of fiber in the slurry or furnish of a colloidal silica aquasol of the invention.

In an alternative embodiment, a nonionic, cationic or anionic polymeric flocculant may be added to the furnish either before or after the addition of the colloidal silica in an amount of from about 0.001 to about 0.5 percent by weight based on dry weight of fiber in the furnish. A cationic starch may alternatively be added to the furnish in place of, or in addition to the synthetic polymer flocculant in an amount of from about 0.005 to about 5.0 percent by weight based on the dry weight of fiber in the furnish. More preferably, the starch is added in an amount of from about 0.05 to about 1.5 percent by weight based on the dry weight of fiber in the furnish. In yet another embodiment, a coagulant may be added to the furnish in place of, or in addition to, the flocculant and/or the starch in an amount of from about 0.005 to about 1.25 percent by weight based on the dry weight of fiber in the papermaking furnish. Preferably, the coagulant is added in an amount of from about 0.025 to about 0.5 percent by weight based on the dry weight of fiber in the furnish.

Using the colloidal silica aquasols of the instant claimed invention it is possible to conduct a method for increasing retention and drainage of a papermaking furnish on a papermaking machine which comprises the steps of adding to a papermaking furnish from about 0.00005 to about 1.25 percent by weight based on the dry weight fiber in the furnish of a colloidal silica aquasol of the invention. The colloidal silica aquasol may be added to the papermaking furnish along with a nonionic, cationic or anionic polymeric flocculant. The flocculant may be added either before or after the colloidal silica in an amount of from about 0.001 to about 0.5 percent by weight based on the dry weight of fiber in the furnish. Starch may alternatively be added to the furnish in place of or in addition to the flocculent in an amount of from about 0.005 to about 5.0 percent by weight based on dry weight of fiber in the furnish. If starch is utilized, it is preferably a cationic starch. When used, the starch is preferably added in an amount of from about 0.05 to about 1.25 percent by weight based on the dry weight of fiber in the furnish. In yet another embodiment, a coagulant may be added to the furnish in place of, or in addition to, the flocculant and/or the starch in an amount of from about 0.005 to about 1.25 percent by weight based on the dry weight of fiber in the furnish. Preferably, the coagulant is added in an amount of from about 0.025 to about 0.5 percent by weight based in the dry weight of fiber in the furnish.

The dosage of the polymeric flocculant in any of the above embodiments is preferably from 0.005 to about 0.2 weight percent based on the dry weight of fiber in the furnish. The dosage of the colloidal silica is preferably from about 0.005 to about 0.25 percent by weight based on the weight of dry fiber in the furnish, and most preferably from about 0.005 to about 0.15 percent by weight of fiber in the furnish.

It should be pointed out that since this invention is applicable to a broad range of paper grades and furnishes, the percentages given above may occasionally vary. It is within the spirit and intent of the invention that variance can be made from the percentages given above without departing from the invention, and these percentage values are given only as guidance to one skilled in the art.

In any of the above embodiments, bentonite, talc, synthetic clays, hectorite, kaolin, or mixtures thereof may also be added anywhere in the papermaking system prior to sheet formation. The preferred addition point is the thick stock pulp before dilution with whitewater. This application results in increased cleanliness of the papermaking operation which otherwise experiences hydrophobic deposition affecting both the productivity and the quality of paper.

In addition, any of the above embodiments may be applied to papermaking furnish selected from the group consisting of fine paper (which as used herein includes virgin fiber based as well as recycle-fiber based materials), board (which as used herein includes recycle-fiber based test liner and corrugating medium as well as virgin-fiber based materials), and newsprint (which as used herein includes magazine finishes as well as both virgin fiber and recycle-fiber based), or other cellulosic material. These furnishes include those that are wood-containing, wood-free, virgin, bleached recycled, unbleached recycled, and mixtures thereof.

Paper or paperboard is generally made from a suspension of furnish of cellulosic material in an aqueous medium, which furnish is subjected to one or more shear stages, in which such stages generally are a cleaning stage, a mixing stage and a pumping stage, and thereafter the suspension is drained to form a sheet, which sheet is then dried to the desired, and generally low, water concentration. The colloidal silicas of the invention may be added to the furnish before or after a shear stage.

In addition to the retention and drainage aid applications described above, the colloidal silicas of the invention may be used in conjunction with standard cationic wet strength resins to improve the wet strength of cellulosic sheet so treated. When utilized in this manner the colloidal silica is added to the furnish prior to placement of the furnish, containing the wet strength resin, on a papermachine. The colloidal silica is generally utilized at the levels set forth above.

The colloidal silica aquasols of the invention has been found to significantly enhance the performance of synthetic polymeric flocculants and retention aids, and starch in the papermaking process. Further, the colloidal silica aquasols are believed to have utility as additives in solids/liquids separation processes such as water pretreatment, and in wastewater treatment applications. The colloidal silica aquasols of the invention in addition to enhancing drainage and retention in newsprint, fine paper, board and other paper grades, may also find utility in pitch and stickies control in papermaking, pulp dewatering in the production of dry-lap pulp, saveall and clarifier applications in pulp and paper mills, water clarification, dissolved air flotation and sludge dewatering. The aquasol compositions of the invention may also find utility in solid/liquid separation or emulsion breaking. Examples of such applications include municipal sludge dewatering, the clarification and dewatering of aqueous mineral slurries, refinery emulsion breaking and the like. The enhanced performance seen utilizing the colloidal silica aquasols of the invention in combination with synthetic polymers and or starch includes higher retention, improved drainage and improved solids/liquids separation, and often a reduction in the amount of polymer or starch used to achieve the desired effect.

Microparticle retention programs are based on the restoration of the originally formed flocs broken by shear. In such applications, the flocculant is added before at least one high shear point, followed by the addition of microparticle just before the headbox. Typically, a flocculant will be added before the pressure screens, followed by the addition of microparticle after the screens. However, a method wherein this order may be reversed is contemplated herein. Secondary flocs formed by the addition of microparticles result in increased retention and drainage without detrimentally affecting formation of the sheet. This allows increased filler content in the sheet, eliminates two-sidedness of the sheet, and increases drainage and speed of the machine in paper manufacturing.

The use of a slight excess of polymeric flocculant and/or coagulant is believed necessary to ensure that the subsequent shearing results in the formation of microflocs which contain or carry sufficient polymer to render at least parts of their surfaces positively charged, although it is not necessary to render the whole furnish positively charged. Thus the zeta potential of the furnish, after the addition of the polymer and after the shear stage, may be cationic or anionic.

Shear may be provided by a device in the apparatus used for other purposes, such as a mixing pump, fan pump or centriscreen, or one may insert into the apparatus a shear mixer or other shear stage for the purpose of providing shear, and preferably a high degree of shear, subsequent to the addition of polymer.

The flocculants used in the application of this invention are high molecular weight water soluble or dispersible polymers which may have a cationic or anionic charge. Nonionic high molecular weight polymers may also be utilized. These polymers may be completely soluble in the papermaking system, or alternatively may be readily dispersible. They may have a branched or crosslinked structure provided that they do not form objectionable "fish eyes", so called globs of undissolved polymer on the finished paper. Polymers of these types are readily available from a variety of commercial sources. They are available as dry solids, aqueous solutions, water-in-oil emulsions which when added to water allow the polymer contained therein to rapidly solubilize, or as dispersions of the water soluble or dispersible polymer in aqueous brine solutions. The form of the high molecular weight flocculent used herein is not deemed to be critical so long as the polymer is soluble or dispersible in the furnish.

As stated above, the polymers may be cationic, anionic, or nonionic. Cationic polymer flocculants useful herein are generally high molecular vinyl addition polymers which incorporate a cationic functional group. These polymers are generally homopolymers of water soluble cationic vinyl monomers, or may be copolymers of a water soluble cationic vinyl monomer with a nonionic monomer such as acrylamide or methacrylamide. The polymers may contain only one cationic vinyl monomer, or may contain more than one cationic vinyl monomer. Alternatively, certain polymers may be modified or derivatized after polymerization such as polyacrylamide by the mannich reaction to produce a cationic vinyl polymer useful in the invention. The polymers may have been prepared from as little as 1 mole percent cationic monomer to 100 mole percent cationic monomer, or from a cationically modified functional group on a post polymerization modified polymer. Most often the cationic flocculants will have at least 5 mole percent of cationic vinyl monomer or functional group, and most preferably, at least 10 weight percent of cationic vinyl monomer or functional group.

Suitable cationic vinyl monomers useful in making the cationically charged vinyl addition copolymers and homopolymers suitable for this invention will be well known to those skilled in the art. These materials include: dimethylaminoethyl methacrylate (DMAEM), dimethylaminoethyl acrylate (DMAEA), diethylaminoethyl acrylate (DEAEA), diethylaminoethyl methacrylate (DEAEM) or their quaternary ammonium forms made with dimethyl sulfate, benzyl chloride or methyl chloride, mannich reaction modified polyacrylamides, diallylcyclohexylamine hydrochloride (DACHA HCl), diallyldimethylammonium chloride (DADMAC), methacrylamidopropyltrimethylammonium chloride (MAPTAC) and allyl amine (ALA). Cationized starch may also be used as a flocculant herein. The flocculant selected may be a mixture of those stated above, or a mixture of those stated above with a cationic starch. Those skilled in the art of cationic polymer based retention programs will readily appreciate that the selection of a particular polymer is furnish, filler, grade, and water quality dependent.

High molecular weight anionic flocculants which may be useful in this invention are preferably water-soluble or dispersible vinyl polymers containing 1 mole percent or more of a monomer having an anionic charge. Accordingly, these polymers may be homopolymers or water soluble anionically charged vinyl monomers, or copolymers of these monomers with for instance non-ionic monomers such as acrylamide or methacrylamide. Examples of suitable anionic monomers include acrylic acid, methacrylamide 2-acrylamido-2-methylpropane sulfonate (AMPS) and mixtures thereof as well as their corresponding water soluble or dispersible alkali metal and ammonium salts. The anionic high molecular weight polymers useful in this invention may also be either hydrolyzed acrylamide polymers or copolymers of acrylamide or its homologues, such as methacrylamide, with acrylic acid or its homologues, such as methacrylic acid, or with polymers of such vinyl monomers as maleic acid, itaconic acid, vinyl sulfonic acid, or other sulfonate containing monomers. Anionic polymers may contain sulfonate or phosphonate functional groups or mixtures thereof, and may be prepared by derivatizing polyacrylamide or polymethacrylamide polymers or copolymers. The most preferred high molecular weight anionic flocculants are acrylic acid/acrylamide copolymers, and sulfonate containing polymers such as those prepared by the polymerization of such monomers as 2-acrylamide-2-methylpropane sulfonate, acrylamido methane sulfonate, acrylamido ethane sulfonate and 2-hydroxy-3-acrylamide propane sulfonate with acrylamide or other non-ionic vinyl monomer. When used herein the polymers and copolymers of the anionic vinyl monomer may contain as little as 1 mole percent of the anionically charged monomer, and preferably at least 10 mole percent of the anionic monomer. Again, the choice of the use of a particular anionic polymer will be dependent upon furnish, filler, water quality, paper grade, and the like.

While most microparticle programs perform well with only a high molecular weight cationic flocculant, the colloidal silica aquasols of the invention may also be utilized with high molecular weight anionic water soluble flocculants with the addition of a cationic coagulant.

Nonionic flocculants useful in the invention may be selected from the group consisting of polyethylene oxide and poly(meth)acrylamide. In addition to the above, it may be advantageous to utilize so called amphoteric water soluble polymers in certain cases. These polymers carry both a cationic and an anionic charge in the same polymer chain.

The nonionic, cationic and anionic vinyl polymer flocculants useful herein will generally have a molecular weight of at least 500,000 daltons, and preferably molecular weights of 1,000,000 daltons and higher. Water soluble and/or dispersible flocculants useful herein may have a molecular weight of 5,000,000 or higher, for instance in the range of from 10 to 30 million or higher. The polymers suitable for the invention may be entirely water soluble when applied to the system, or may be slightly branched (two-dimensional) or slightly cross linked (three dimensional) so long as the polymers are dispersible in water. The use of polymers which are entirely water soluble is preferred, but dispersible polymers, such as those described in WO 97/16598, may be employed. Polymers useful may be substantially linear as such term is defined in Langley et. Al., U.S. Pat. No. 4,753,710. The upper limit for molecular weight is governed by the solubility or dispersibility of the resulting product in the papermaking furnish.

Cationic or amphoteric starches useful in the application of this invention are generally described in U.S. Pat. No. 4,385,961, the disclosure of which has been incorporated by reference into this specification. Cationic starch materials are generally selected from the group consisting of naturally occurring polymers based on carbohydrates such as guar gum and starch. The cationic starch materials believed to be most useful in the practice of this invention include starch materials derived from wheat, potato and rice. These materials may in turn be reacted to substitute ammonium groups onto the starch backbone, or cationize in accordance with the process suggested by Dondeyne et al, in WO 96/30591. In general, starches useful for this invention have a degree of substitution (d.s.) of ammonium groups within the starch molecule between about 0.01 and 0.05. The d.s. is obtained by reacting the base starch with either 3-chloro-2-hydroxypropyl-trimethylammonium chloride or 2,3-epoxypropyl-trimethylammonium chloride to obtain the cationized starch. As will be appreciated, it is beyond the scope and intent of this invention to describe means for the cationizing of starch materials and these modified starch materials are well known and are readily available from a variety of commercial sources.

Various characteristics of the cellulosic furnish, such as pH, hardness, ionic strength and cationic demand, may affect the performance of a flocculant in a given application. The choice of flocculent involves consideration of the type of charge, charge density, molecular weight and type of monomers and is particularly dependent upon the water chemistry of the furnish being treated.

Other additives may be charged to the cellulosic furnish without any substantial interference with the activity of the present invention. Such other additives include for instance sizing agents, such as alum and rosin, pitch control agents, extenders, biocides and the like. The cellulosic furnish to which the retention aid program of the invention is added may also contain pigments and or fillers such as titanium dioxide, precipitated and/or ground calcium carbonate, or other mineral or organic fillers. It may be possible, that the instant invention may be combined with other so called microparticle programs such as bentonite and kaolin. When papermakers change grades or furnishes it is possible that in certain situations the combination of the colloidal silica aquasols of the invention with other microparticles may be practical and desirable.

The colloidal silica aquasols of the invention may also be used in combination with a coagulant according to the teachings of Sofia et al., U.S. Pat. No. 4,795,531, the disclosure of which is hereinafter incorporated by reference into this specification. Sofia teaches a microparticle program in which a microparticle is utilized in the presence of a cationic coagulant and a high molecular weight charged flocculant.

The cationic coagulant materials which may find use in this aspect of the invention include well known commercially available low to mid molecular weight water soluble polyalkylenepolyamines including those prepared by the reaction of an alkylene polyamine with a difunctional alkyl halide. Materials of this type include condensation polymers prepared from the reaction of ethylenedichloride and ammonia, ethylene dichloride, ammonia and a secondary amine such as dimethyl amine, epichlorohydrin-dimethylamine, epichlorohydrin-dimethylamine-ammonia, polyethyleneimines, and the like. Also useful will be low molecular weight solution polymers and copolymers of vinyl monomers such as diallyldimethylammonium halides, especially diallyldimethylammonium chloride, dialkylaminoalkylacrylates, dialkylaminoalkylacrylate quaternaries, and the like where 'alkyl' is meant to designate a group having 1–4, and preferably 1–2 carbon atoms. Preferably 'alkyl' is methyl. These monomers are exemplified by such materials as dimethylaminoethyl acrylate, dimethylaminoethyl methacrylate and their water soluble quaternary ammonium salts. In certain cases cationic starch may be employed as the coagulant. Inorganic coagulants, e.g., alum and polyaluminum chloride, may also be used in this invention. The usage rate of inorganic coagulants is typically from 0.05 to 2 weight percent based on the dry weight of fiber in the furnish. The use of a coagulant with the colloidal silica sols of the invention is optional.

The method of the invention is applicable to all grades and types of paper products that contain the fillers described herein, and further applicable for use on all types of pulps including, without limitation, chemical pulps, including sulfate and sulfite pulps from both hardwood and softwood, thermo-mechanical pulps, mechanical pulps and groundwood pulps.

The amount of any mineral filler used in the papermaking process, generally employed in a papermaking stock is from about 10 to about 30 parts by weight of the filler per hundred parts by weight of dry fiber in the furnish, but the amount of such filler may at times be as low as about 5, or even 0, parts by weight, and as high as about 40 or even 50 parts by weight, same basis.

The following examples are intended to illustrate the invention and should not be construed as a limitation thereof.

EXAMPLE 1

First Preparation of a Colloidal Silica Aguasol of the Invention

Charge 285.8 pounds of soft water to a reactor containing a recycle pump, and begin recycling at a rate of 50 gallons per minute (gpm). Slowly add to the reactor 5.63 pounds of a 93.5% by weight sulfuric acid solution while cooling the contents of the reactor if necessary to lower the temperature below 75 degrees F. After allowing the contents of the reactor to circulate for 5 minutes, charge 289.5 pounds of sodium silicate having a weight ratio of $SiO_2$ to $Na_2O$ of 3.26 and a pH of 11.2. Apply cooling to prevent the reactor temperature from exceeding 81 degrees F. After the sodium silicate is added, start the addition of 3169.1 pounds of aqueous silicic acid (having a $SiO_2$ solids content of 6.40 percent by weight) at the rate of 13.20 pounds/minute (or 1.52 gallons/minute) while maintaining the temperature at 80 degrees F. When 75 percent of the silicic acid (2376.8 pounds) has been charged (approximately 3.0 hours), the temperature is slowly increased at the rate of 0.7 degrees F./minute until the temperature of 120 degrees F. is reached. Continue to add the silicic acid while heating the composition. The amount of time for the composition to reach 100 degrees F. is 10 minutes and the elapsed time to reach 115 degrees F. is 36 minutes. After all of the silicic acid has been added, the temperature of the composition is held at 120 degrees F. for one hour (i.e., start timing after the silicic acid addition has been completed). Thereafter, the temperature is held at 118–122 degrees F. whereupon ultrafiltration is applied to the composition for the purpose of increasing the solids concentration of the composition. Ultrafiltration is discontinued when the concentration of silica reaches from about 7.00 percent by weight to about 16.8 percent by weight.

The resulting colloidal silica aquasol composition of the invention is determined to have a specific gravity of 1.1048, a surface area of the silica of 804.3 m²/g and an S-value of 48.1. Moreover, after 45 days at room temperature the surface area of the silica is determined to be 751 m²/g.

EXAMPLE 2

Second Preparation of a Colloidal Silica Aguasol of the Invention

Charge a round bottom flask with 151.2 grams of deionized water and 4.0 grams of sodium sulfate and swirl until the sodium sulfate dissolves. Add 124.8 grams of sodium silicate to the flask while mixing. Heat the contents of the flask to 80° F. Add a total of 1720 grams of silicic acid, having a specific gravity of 1.039, to the flask over 4 hours at a rate of 7.2 grams per minute. After 860 grams or one-half of silicic acid is added, heat the content of the flask to a final temperature of 120° F. Continue to add the silicic acid while heating the composition. Thereafter, the temperature is held at 118–122° F. After the final addition at four hours, cool the reaction flask to room temperature whereupon ultrafiltration is applied to 350 grams of the composition for the purpose of increasing the solids concentration of the composition. Ultrafiltration is discontinued when measured amount of water removed reached 166.82 grams. The solids of the final composition is 16.12 percent by weight.

The resulting colloidal silica aquasol composition of the invention is determined to have a specific gravity of 1.1067, a surface area of 904 m²/g and an S-value of 39. After thirty-three days, the surface area was measured to be 904 m²/g.

EXAMPLE 3

Third Preparation of a Colloidal Silica Aquasol of the Invention

Charge 285 pounds of soft water to the reactor containing a recycle pump, and begin recycling a rate of 50 gpm. Slowly add to the reactor 5.63 pounds of 93.5% by weight sulfuric acid solution while cooling the contents of the reactor if necessary to lower the temperature to 75° F. After allowing the contents of the reactor to circulate for 5 minutes, charge 290 pounds of sodium silicate having a weight ratio of $SiO_2$ to $Na_2O$ of 3.26 and a pH of 11.2. Apply cooling to prevent the reactor temperature from exceeding 81 degrees F. After the sodium silicate is added, start the addition of 3225 pounds of aqueous silicic acid (having a $SiO_2$ solids content of 6.37 percent by weight, a viscosity of 2.9 centipoise, a specific gravity of 1.0388 and a pH of 2.76) at the rate of 13.4 pounds/minute while maintaining the temperature at 80 degrees F. When 75 percent of the silicic acid (2419 pounds) has been charged (approximately 3.0 hours), the temperature is slowly increased at the rate of 0.7 degrees F./minute until the temperature of 120 degrees F. is reached. Continue to add the silicic acid while heating the composition. The amount of time for the composition to reach 100 degrees F. is 40 minutes and the elapsed time to reach 115 degrees F. is 57 minutes. After all of the silicic acid has been added, the temperature of the composition is held at 120 degrees F. for one hour (i.e., start timing after the silicic acid addition has been completed). Thereafter, the temperature is held at 118–122 degrees F. whereupon ultrafiltration is applied to the composition for the purpose of increasing the solids concentration of the composition. Ultrafiltration is discontinued when the concentration of silica reaches from about 7.00 percent by weight to about 16.8 percent by weight.

The resulting colloidal silica composition of the invention is determined to have a specific gravity of 1.1033, a surface area of the silica of 786.4 m²/g and an S-value of 41. After 51 days, the surface area was measured to be 711.2 m²/g.

EXAMPLE 4

Fourth Preparation of a Colloidal Silica Aquasol of the Invention

Charge a reaction vessel fitted with a screen near the bottom of the vessel with 226 gallons of Amberlite® IRC84SP ion exchange resin (available from Rohm & Haas) in its sodium form. Follow manufacturer's procedure for regenerating the resin to the hydrogen form such that the regeneration is at least 40 percent complete. Rinse the resin clean with water and drain the water.

Charge 1469 pounds of water into the vessel and start mixing the contents of the vessel to suspend the resin. Next, heat the contents of the reactor to 75 degrees F. Charge the reaction vessel (over a period of about 10 minutes) with 1231 pounds of sodium silicate (having a mole ratio of $SiO_2$ to $Na_2O$ of 3.26 and a pH of 11.2.) diluted with 564 pounds of water. Monitor the pH and the conductivity of the contents of the reaction vessel about every 10 minutes until the pH reaches 9.8 and the conductivity reaches 5800 μmho.

To the contents of the reactor, add 150 pounds of sodium silicate (as described above) to raise the pH to approximately 10.6. Stir the contents of the container for approximately 20 minutes, and thereafter remove the contents of the reaction vessel from the bottom through the screen. A small amount of water is rinsed through the resin to remove residual product and then mixed into the product.

The resulting colloidal silica composition of the invention is determined to have a specific gravity of 1.0877, a surface area of the silica of 927.4 m²/g, an S-value of 32, and a percent by weight $SiO_2$ solids content of 12.9 percent.

EXAMPLE 5

Not an Example of the Invention

Method for Calculating the $SiO_2/Na_2O$ Ratio

The formulas used for making the silica as disclosed in the patent application contain the following reactants: sodium silicate solution, acid sol and sulfuric acid solution. The sodium silicate solution contains 29.17% $SiO_2$ and 8.948% $Na_2O$ by weight. The $SiO_2/Na_2O$ weight ratio in sodium silicate is 3.26. The concentration of $SiO_2$ in acid sol varies from batch to batch. The concentration of the sulfuric acid used for the examples is 93.5%. The sulfuric acid is either used directly in the reaction to neutralize $Na_2O$ or used to regenerate the ion exchange that is then used to neutralize $Na_2O$.

The total amount of $SiO_2$ in a sample can be calculated by summing the amount of $SiO_2$ in sodium silicate and the amount of $SiO_2$ in acid sol. The number of moles of $SiO_2$ in the sample is obtained by dividing the amount of $SiO_2$ by its molecular weight. The number of moles of $Na_2O$ is calculated by multiplying the amount of sodium silicate solution used in the example by the concentration of $Na_2O$ and then divided by its molecular weight. The number of mole of sulfuric acid can be calculated similarly. Since each $H_2SO_4$ molecule neutralizes one $Na_2O$ molecule, the number of $Na_2O$ molecule remaining in the sample is the difference in the number of $Na_2O$ molecule from sodium silicate solution and the number of $H_2SO_4$ molecule from sulfuric acid. From the number of mole of $SiO_2$ used in the formula and the number of mole of $Na_2O$ remaining in the sample, the $SiO_2/Na_2O$ molar ratio can be calculated.

Illustration of Calculation

The following illustration used the data from Example 1.

The molecular weight of $H_2SO_4$=98.08

The molecular weight of $SiO_2$=60.08

The molecular weight of $Na_2O$=61.98

Concentration of $SiO_2$ in sodium silicate by weight=29.17%

Concentration of $Na_2O$ in sodium silicate by weight=8.948%

$SiO_2/Na_2O$ weight ratio of sodium silicate=3.26

Concentration of $SiO_2$ in acid sol by weight=6.4%

Concentration of $H_2SO_4$ in sulfuric acid solution by weight=93.5%

The amount of sodium silicate solution used in the example=289.5 lbs

The amount of acid sol used in the example=3169.1 lbs

The amount of sulfuric acid solution used=5.63 lbs

Total number of lb-mole of $SiO_2$ in the sample=(sodium silicate solution used×$SiO_2$ conc.+acid sol used×$SiO_2$ conc.)/$SiO_2$ ml. wt.=(289.5 lbs×29.17%+3169.1 lbs×6.4%)/(60.08 lbs/lb-mole)=4.781 lb-moles The number of lb-mole of $Na_2O$ from sodium silicate solution=the amount of sodium silicate used×$Na_2O$ concentration/$Na_2O$ ml. wt.=289.5 lbs×8.948%/(61.98 lbs/lb-mole)=0.418 lb-moles The number of lb-mole of $H_2SO_4$ used=the amount of sulfuric acid solution used×its concentration/$H_2SO_4$ ml. wt.=5.63 lbs× 93.5%/(98.08 lbs/lb-mole)=0.054 lb-moles Since each mole of $H_2SO_4$ will neutralize a mole of $Na_2O$, therefore, The number of lb-mole of $Na_2O$ remaining in the sample=number of lb-mole of $Na_2O$ in sodium silicate−number of lb-mole $H_2SO_4$ used=0.418 lb-moles−0.054 lb-moles=0.364 lb-moles The molar ratio of $SiO_2/Na_2O$ in the sample=lb-mole of $SiO_2$/lb-mole $Na_2O$ remaining in the sample=4.781 lb-moles/0.364 lb-moles=13.1

The molar ratio of $SiO_2/Na_2O$ in the other samples can be calculated similarly. The results are in TABLE 1.

TABLE 1

| Sample | Description | $SiO_2/Na_2O$ molar ratio | Surface area (new sample) ($m^2/g$) | Surface area (aged sample) ($m^2/g$) |
|---|---|---|---|---|
| Sample 1 | Made via Example 1 | 13.1 | 804.3 | 751 (after 45 days) |
| Sample 2 | Made via Example 2 | 13.5 | 904 | 904 (after 30 days) |
| Sample 3 | Made via Example 3 | 13.2 | 786.4 | 711.2 (after 51 days) |
| Sample 4 | Made via Example 4 | 16.9 | 927.4 | 860 (after 2 months) |

In U.S. Pat. No. 5,447,604, to Johansson, it was stated that "the (upper) limit (molar ratio of $SiO_2/Na_2O$) 12:1 is essential for maintaining the high specific surface area of the particles." To the contrary, this data showed that the surface area can be maintained at greater than 700 $m^2/g$ for at least 30 days with a $SiO_2/Na_2O$ molar ratio greater than 13.

EXAMPLE 6

The Use of the Claimed Aquasols of the Invention in Papermaking

This is not an Example of the Instant Claimed Invention

A A. Preparation of Synthetic Standard Furnishes

Alkaline Furnish—The alkaline furnish has a pH of 8.1 and is composed of 70 weight percent cellulosic fiber and 30% weight percent filler diluted to an overall consistency of 0.5% by weight using synthetic formulation water. The cellulosic fiber consists of 60% by weight bleached hardwood kraft and 40% by weight bleached softwood kraft. These are prepared from dry lap beaten separately to a Canadian Standard Freeness (CSF) value ranging from 340 to 380 CSF. The filler was a commercial ground calcium carbonate provided in dry form. The formulation water contained 200 ppm calcium hardness (added as $CaCl_2$), 152 ppm magnesium hardness. (added as $MgSO_4$), and 110 ppm bicarbonate alkalinity (added as $NaHCO_3$)

Acid Furnish—The acid furnish consisted of kraft hardwood/softwood weight ratio, i.e., 60/40. As above, the fibers are refined separately to a 340 to 380 CSF prior to be combined with the filler and water. The total solids of the furnish comprised 92.5% by weight cellulosic fiber and 7.5% by weight filler. The filler was a combination of 2.5% by weight titanium dioxide, Titanox 1000 from DuPont, and 5.0 percent by weight kaolin clay. The water used to dilute the fiber and filler again contains additional salts as outlined in the alkaline furnish above. Other additives included alum dosed at 20 lbs active per ton dry solids. The pH of the furnish was adjusted with diluted 50% sulfuric acid such that the furnish pH was 5.0 after alum addition.

FBRM Data (Focused Beam Reflectance Measurement)

The Scanning Laser Microscopy employed in the following examples is outlined in U.S. Pat. No. 4,871,251, issued to Preikschat, F. K. and E. (1989) and generally consists of a laser source, optics to deliver the incident light to and retrieve the scattered light from the furnish, a photodiode, and signal analysis hardware. Commercial instruments are available from Lasentec™, Redmond, Wash.

The experiment consists of taking 300 mL of cellulose fiber containing slurry and placing this in the appropriate mixing beaker. Shear is provided to the furnish via a variable speed motor and propeller. The mixer is set at 720 rpm for all experiments herein. The propeller is set at a fixed distance from the probe window to ensure slurry movement across the window. A typical test sequence is shown below for both alkaline (TABLE 2) and acid (TABLE 3) furnishes.

TABLE 2

FBRM Test Protocol
Alkaline Furnish

| Time (minutes) | Action |
|---|---|
| 0.00 | Commence mixing. Record baseline floc size. |
| 0.50 | Add cationic starch. Record floc size change. |
| 0.75 | Add flocculant. Record floc size change. |
| 1.50 | Add the microparticle. Record floc size change. |
| 2.50 | Terminate experiment. |

TABLE 3

FBRM Test Protocol
Acid Furnish

| Time (minutes) | Action |
|---|---|
| 0.00 | Commence mixing. Record baseline floc size. |
| 0.50 | Add cationic starch and alum. Record floc size change. |
| 0.75 | Add flocculant. Record floc size change. |
| 1.50 | Add the microparticle. Record floc size change. |
| 2.50 | Terminate experiment. |

The change in the mean chord length of the flocs after the addition of the microparticle dose has been correlated with Dynamic Drainage Jar retention measurements. Hence, the greater the change in mean chord length induced by the treatment, the higher the retention value.

Physical Properties of Test Material

The following materials are used in the examples of this patent and their physical properties are defined below.

| Sample Id | Description | Initial Surface Area m²/g | S-Value |
|---|---|---|---|
| CCS | Conventional Colloidal Silica | 680 | 63.4 |
| Sample 1 | Made via Example 1 | 970 | 42.0 |
| Sample 2 | Made via Example 2 | 904 | 39.0 |
| Sample 3 | Made via Example 3 | 883 | 32.7 |
| Sample 4 | Made via Example 3 | 927 | 32.0 |

B(1). Improved Retention in Acid Furnish

A synthetic acid furnish was prepared as outlined above in "Standard Synthetic Furnishes". FBRM experiments were carried with the following results.

| Dose in Actives | Change in mean chord | | | % Improvement | | |
|---|---|---|---|---|---|---|
| | Conventional Colloidal | Sample | | Conventional Colloidal | Sample | |
| lbs/ton | Silica | 1 | 2 | Silica | 1 | 2 |
| 0.5 | 5.80 | 8.45 | 10.40 | 0.0% | 45.7% | 79.3% |
| 1.0 | 13.80 | 19.30 | 19.12 | 0.0% | 39.9% | 38.6% |
| 2.0 | 19.70 | 33.73 | 31.55 | 0.0% | 71.2% | 60.2% |

As can be seen in the data above, the materials which are the subject of the current patent demonstrate some 60 to 70% improvement at a dose of 2 lbs/ton in the ability to increase the degree of flocculation in this synthetic acid furnish.

B(2). Improved Retention in Alkaline Furnish

In a similar way, materials were tested in the "Standard Alkaline Synthetic Furnish." Likewise, FBRM experiments were carried out and the results are summarized below.

| Dose in Actives | Change in mean chord | | | % Improvement | | |
|---|---|---|---|---|---|---|
| | Conventional Colloidal | Sample | | Conventional Colloidal | Sample | |
| lbs/ton | Silica | 1 | 2 | Silica | 1 | 2 |
| 0.5 | 3.80 | 10.39 | 6.41 | 0.0% | 173.4% | 68.7% |
| 1.0 | 8.50 | 18.30 | 19.05 | 0.0% | 115.3% | 124.1% |
| 2.0 | 12.10 | 34.79 | 29.64 | 0.0% | 187.5% | 145.0% |

The results above demonstrate that colloidal silica aquasols made via the process herein provide higher retention in alkaline furnishes than conventional colloidal silica aquasols. In this case, the improvement is from 50 to >100% over the results obtained using conventional colloidal silica.

In yet another experiment involving a synthetic alkaline furnish as described above, the following results were found.

| Dose in Actives | Change in mean chord | | % Improvement | |
|---|---|---|---|---|
| | Conventional | Sample | Conventional | Sample |
| lbs/ton | Colloidal Silica | 3 | Colloidal Silica | 3 |
| 0.5 | 4.13 | 12.37 | 0.0% | 199.5% |
| 1.0 | 11.98 | 28.68 | 0.0% | 139.4% |
| 2.0 | 18.73 | 44.35 | 0.0% | 136.8% |

In the study above, the subject patent material improved the degree of flocculation in synthetic alkaline finish by over 100% compared to that of conventional colloidal silica. Hence, the subject materials provide marked improvement in retention of alkaline paper furnishes.

C. Drainage Improvements

Drainage was measured using a Vacuum Drainage Tester, from Nalco Chemical Co. A 500 mL volume of stock was placed in the stock reservoir of the instrument, dosed with additives while under agitation, and drained. Drainage of the stock occurred under vacuum, in this case, onto a Filpako #716 cellulose filter paper. The time required from the start of drainage until air was pulled through the pad was recorded as the "drain time". The final vacuum value, read from the vacuum gage, was recorded 10 seconds after the vacuum break. The vacuum level applied was 14 in. of Hg and the mixing speed was 900 rpm, controlled by a digital Cole-Palmer ServoDyne Mixer System Controller.

The furnish used in this testing was an alkaline furnish composed of softwood at 13%, hardwood at 49%, groundwood at 6.0% and broke of 31.6%. The consistency was 1.0%. Staech (Stalock cationic starch) was added at 40 lbs/ton. The flocculent cationic polyacrylamide, cPAM. It was added at 0.6 lbs/ton. The addition sequence was as follows:

| Sequence Time (sec) | Action |
|---|---|
| 0 | Add furnish, start agitator at 900 rpm. |
| 10 | Add starch. |
| 20 | Add cPAM. |
| 40 | Add microparticle. |

-continued

| Sequence Time (sec) | Action |
|---|---|
| 50 | Stop mixing and transfer to VDT. |
| 60 | Start drainage test. |

Besides the drain time and final vacuum, the drainage rate, defined as the time needed to drain 300 mL of filtrate, was also recorded. The results are tabulated below.

| | Dose (lbs/ton) | | Time (sec) | | |
|---|---|---|---|---|---|
| Description | Flocculant | Microparicle | Rate | Drain | Final Vac |
| Blank | 0 | 0 | 35.0 | 75.0 | 13.5 |
| Flocculant only | 0.6 | 0 | 11.2 | 25.7 | 10.2 |
| CCS | 0.6 | 1 | 8.9 | 18.2 | 9.0 |
| CCS | 0.6 | 2 | 8.3 | 16.7 | 8.5 |
| CCS | 0.6 | 3 | 7.4 | 15.6 | 8.0 |
| Sample 4 | 0.6 | 1 | 6.5 | 12.3 | 6.3 |
| Sample 4 | 0.6 | 2 | 5.8 | 11.1 | 4.6 |
| Sample 4 | 0.6 | 3 | 5.7 | 11.1 | 4.6 |

As seen in this data, the claimed colloidal silica aquasols, represented by Sample 4, increased the drainage rate by a factor of 7 over the blank and by about 2 over the flocculant only treatment. Similar improvements are observed in the drain time and final vacuum. Hence, the subject materials improve the drainage.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. A stable aquasol comprising colloidal silica having a surface area of from about 700 $m^2/g$ to about 970 $m^2/g$, and an S-value of from about 20 to about 50; wherein said colloidal silica is not surface treated; wherein the molar ratio of $SiO_2/Na_2O$ in said colloidal silica is greater than about 13.0:1 and is less than about 17.0:1; and wherein said aquasols have a percent by weight $SiO_2$ solids level of from about 7.00 percent to about 16.80 percent.

2. A stable aquasol comprising colloidal silica having a surface area of from about 790 $m^2/g$ to about 970 $m^2/g$, and an S-value of from about 20 to about 50; wherein said colloidal silica is not surface treated; wherein the molar ratio of $SiO_2/Na_2O$ in said colloidal silica is greater than about 13.0:1 and is less than about 17.0:1; and wherein said aquasols have a percent by weight $SiO_2$ solids level of from about 7.00 percent to about 16.80 percent.

3. A stable aquasol comprising colloidal silica having a surface area of from about 857 $m^2/g$ to about 970 $m^2/g$, and an S-value of from about 20 to about 50; wherein said colloidal silica is not surface treated; wherein the molar ratio of $SiO_2/Na_2O$ in said colloidal silica is greater than about 13.0:1 and is less than about 17.0:1; and wherein said aquasols have a percent by weight $SiO_2$ solids level of from about 7.00 percent to about 16.80 percent.

* * * * *